May 22, 1934.   W. F. H. BRAUN   1,960,201
LAWN MOWER
Filed March 4, 1931   2 Sheets-Sheet 1

INVENTOR
William F. H. Braun
BY
Augustus B Stoughton
ATTORNEY.

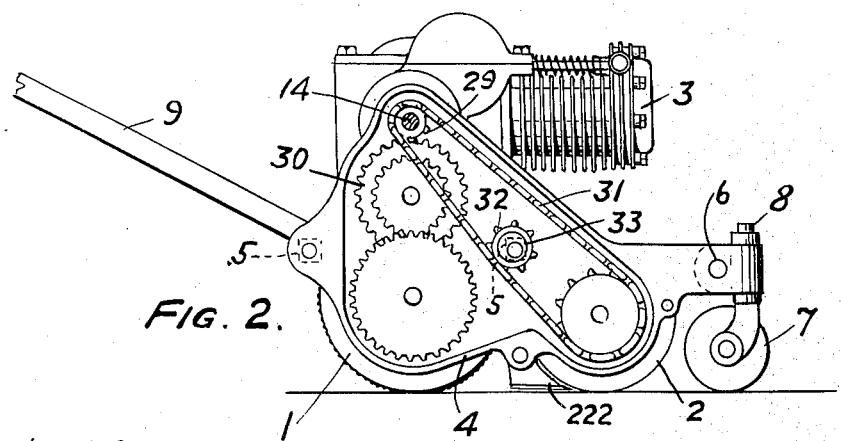

Patented May 22, 1934

1,960,201

UNITED STATES PATENT OFFICE 1,960,201

LAWN MOWER

William F. H. Braun, Wynnewood, Pa., assignor to Pennsylvania Lawn Mower Works, Philadelphia, Pa., a corporation of Pennsylvania Application March 4, 1931, Serial No. 519,932

3 Claims. (Cl. 56—26)

My device consists of a lawn mower driven by an internal combustion engine and provided with means which are manually operable for connecting the driving means of the lawn mower to said engine and for then connecting the mower of the lawn mower to the engine.

These control means consist of a grip portion suitable for manual operation, a control member moved by movement of said grip, a clutch arranged to engage when said control member is partially released, a second clutch arranged to engage when said control member is wholly released, connections including said first clutch between the lawn mower engine and the means for driving the lawn mower, and connections including said second clutch between the lawn mower engine and the mower of the lawn mower.

For a further exposition of my invention reference may be had to the annexed drawings and specification at the end whereof my invention will be specifically pointed out and claimed.

In the drawings,

Figure 2 is a side elevation of my device with the side cover plate removed.

Figure 3 is a cross section through the clutch mechanism.

Figure 4 is an end view of one of the clutches in disengaged position.

Figure 5 is a view in side elevation through one of the clutches with the driven member in vertical cross section, and Figure 6 is a vertical end view of a clutch driving member.

Figure 1:
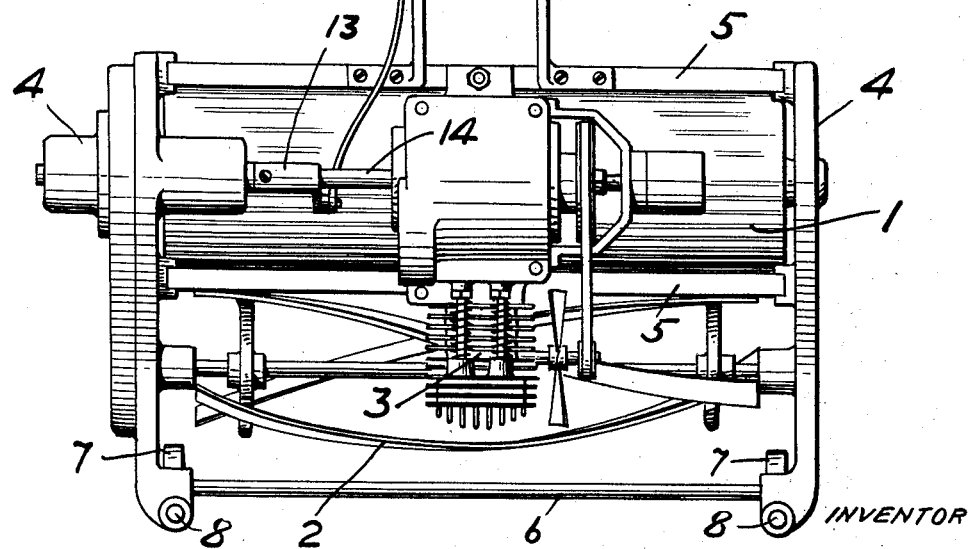
Figure 1 is a plan view of my device.

In the embodiment of my invention, chosen for illustration in the drawings, my improved lawn mower is shown as consisting of a roller 1 which forms the driving means for the lawn mower. There is also shown a mower 2 which consists of a plurality of cutter bars mounted to rotate about a common shaft. My lawn mower is designed to be driven about from place to place and the mower 2 is designed to be driven by an internal combustion engine generally indicated at 3. It will, of course, be obvious that any other suitable source of power, such as an electric motor and a storage battery therefor may be used if desired. Roller 1 and mower 2 are mounted on suitable shafts journaled in suitable bearings in sides 4. The sides 4 are rigidly braced together by bars 5 and at their front end by rod 6 so that a solid structure or chassis is provided for the support of roller 1, mover 2 and engine 3. At its front end the body carries the guide rollers 7 which are mounted so as to be freely rotatable about casters 8.

At its rear the body is provided with a rigid handle 9 having at its upper end grips 10 and 11 which are adapted to be grasped manually by the operator of the machine to guide the machine when in use.

An important feature of my invention is the novel control means whereby the engine 3 may be connected to the roller 1 and whereby the engine 3 may then be connected to the mower 2. These control means consist of the grip 11 which is rotatably mounted on handle 9. Attached to grip 11 is a rod 12 which in turn moves control member 13 in response to the movements of grip 11.

Having reference now more particularly to Figures 3, 4, 5 and 6, the control means is shown as consisting of control member 13 which is mounted so as to be freely rotatable about shaft 14 which is connected at one end to the engine 3. Control member 13 carries on its surface, screw threads 15 which cooperate with suitable threads in bushing 16, which bushing is firmly mounted so as to be stationary in side 4. There are also mounted on shaft 14 a pair of clutches generally indicated as A and B which are substantial duplicates so that a description of one will suffice for both. A is the driving clutch while B is the mower clutch.

Clutches A and B are made up of a center 17 which is fixed to shaft 14 by means of pin 88 or in any other suitable manner. Surrounding a portion of center 17 there is a driving member 18 which consists of a substantially cylindrical element having a portion broken away and which is made of metal having a spring-like character. The opening in the driving member 18 is best seen in Figure 6. Mounted on or adjacent center 17 in any suitable manner, so as to be located within the opening in driving member 18, there are a pair of actuating members 19 which at their outer ends bear on an actuator 20 mounted on a ring 21 which is slidably mounted on a shoulder on center 17 or in any other convenient location. The spring tension of driving member 18 serves to keep actuating members 19 contacting with the curved surfaces of actuator 20. Ring 21 has at its opposite end from center 17 a flange 22 which is partially cut away at 23 as is best seen in Figure 5. Interposed between center 17 and ring 21, clutches A and B are provided with springs $a$ and $b$ respectively. The control member 13 carries at its inner end a recess 24 of suitable size to receive therein the end of center 17 adjacent the control member 13. At its outer end shaft 14 is journaled in casing 4 by a bearing 25 which has in its inner end a recess 26 of suitable size to receive the end of center 17 of clutch B adjacent thereto. Surrounding the driving members 18, clutches A and B have driven members 27, driven member 27 of clutch A having on its outer surface a gear 28 and driven member 27 of clutch B having thereon a sprocket 29.

As is best seen in Figure 2, gear 28 (shown in Fig. 3) meshes with a train of gears 30 so as to drive roller 1. Sprocket 29 meshes with chain 31 so as to drive mower 2. Chain 31 is provided with a chain tightener 32 which is mounted on an eccentric 33. The eccentric 33 is adjustable to various positions to vary the axis of rotation of the chain tightener 32 with respect to chain 31. Figure 2 also shows the stationary cutter blade 222 which cooperates with mower 2 to cut the grass.

The operation of my device is as follows: When it is desired to start the lawn mower the grip portion 11 is moved two steps from its normal location. The engine 3 is then started in any convenient manner. In normal position grip 11 permits both clutches to be in engagement so that it is not necessary for the operator of the lawn mower to continuously hold the grip 11 in order to keep the clutches A and B in engaged position. Movement of grip 11 through one step from its normal position rotates control member 13 by means of rod 12 and the engagement of threads 15 with bushing 16. Control member 13 moves to the left, as seen in Figure 3. Control member 13 bears on ring 21 which transmits the pressure to spring $a$, center 17 and pin 88 of clutch A and thence to shaft 14 which in turn transmits the pressure to pin 88 and center 17 of clutch B, and thus causes compression of spring $b$ which is weaker in compression than spring $a$. Compression of spring $b$ moves center 17 closer to ring 21 of clutch B and, therefore, permits actuator members 19 to slide down the curved surfaces of actuator 20 and to, therefore, permit driving member 18 to disengage driven member 27. Clutch B is thus disengaged and its driven member 27 is free to rotate about shaft 14.

A second movement of grip 11 moves control member 13 another step to the left as seen in Figure 3, and because of recess 24, causes ring 21 of clutch A to compress spring $a$ and to disengage driving member 18 from driven member 27 of clutch A by the same sequence of operation as described in connection with clutch B.

Clutches A and B are now in a suitable position, so that neither of the driven members 27 are connected to shaft 14. This is a suitable position for starting engine 3. When engine 3 is in proper operation, and it is desired to move the lawn mower about from place to place, grip 11 is moved back one step thereby permitting the expansion of spring $a$ and the connection of driving member 18 to driven member 27 of clutch A. This closes the connection between shaft 14 and gear 28 and thereby causes roller 1 to be driven by engine 3 through gears 30 and to move the lawn mower about.

When it is desired to actuate mower 2 to start the grass cutting operation of the lawn mower, grip 11 is returned another step to normal location. This permits the expansion of spring $b$ and the consequent engagement of driving member 18 and driven member 27 of clutch B so that sprocket 29 is now connected to shaft 14 and mower 2 is driven from engine 3 through chain 31. It will thus be seen that the connection of mower 2 or driving means 1 are under the convenient control of the operator of the lawn mower at all times.

I do not intend to be limited in the practice of my invention save as the scope of the prior art and of the attached claims may require.

I claim:

1. A lawn mower including, in combination, an engine, driving means for said lawn mower, a mower, connections including a driving clutch between said engine and said driving means, connections including a mower clutch between said engine and said mower, and a single control means adapted to close said driving clutch and then said mower clutch and to open said mower clutch and then said driving clutch.

2. A lawn mower including an engine, driving means for said lawn mower, a mower, driving connections between said engine and said driving means, a driving clutch in said driving connections, a spring in said driving clutch, mower connections between said engine and said mower, a mower clutch in said mower connections, a spring in said mower clutch, said driving clutch spring being stronger than said mower clutch spring, and a control member adapted to actuate said clutches by tensioning said springs against each other whereby said driving clutch closes and then said mower clutch closes and said mower clutch opens and then said driving clutch opens.

3. A lawn mower including an engine, driving means for said lawn mower, a mower, a shaft connected to said engine, a control member freely mounted on said shaft, a driving clutch mounted on said shaft, a driving clutch spring in said driving clutch, driving clutch actuating means mounted on said shaft adjacent said driving clutch and receiving said driving clutch spring between said driving clutch actuating means and said driving clutch, connections between said driving clutch and said driving means, a mower clutch mounted on said shaft, a mower clutch spring in said mower clutch, mower clutch actuating means mounted on said shaft adjacent said mower clutch and receiving said mower clutch spring between said mower clutch actuating means and said mower clutch, connections between said mower clutch and said mower, said mower clutch spring being weaker in compression than said driving clutch spring whereby movement of said control member axially of said shaft compresses said mower clutch spring thereby disengaging said mower clutch and then compresses said driving spring thereby disengaging said driving clutch and so that upon movement of said control member in the opposite direction axially of said shaft said driving clutch spring expands thereby engaging said driving clutch and then said mower clutch spring expands thereby engaging said mower clutch.

WILLIAM F. H. BRAUN.